United States Patent [19]

Reich

[11] 3,737,862

[45] June 5, 1973

[54] CONTROL SYSTEM HAVING COLUMN TIMERS AT EACH END

[75] Inventor: Zygmund Reich, Huntington, N.Y.

[73] Assignee: Instrument Systems Corporation, Jericho, L.I., N.Y.

[22] Filed: Apr. 24, 1972

[21] Appl. No.: 246,919

[52] U.S. Cl. .............................340/163 R, 340/147 R
[51] Int. Cl. ................................................H04g 9/00
[58] Field of Search .......................340/163 R, 147 R

[56] References Cited

UNITED STATES PATENTS 3,585,595   6/1971   Slavin ..............................340/163 R

*Primary Examiner*—Harold I. Pitts
*Attorney*—Alex Friedman, Harold I. Kaplan and James K. Silberman

[57] ABSTRACT

A control system for disposing each of a plurality of utilization circuits in a state responsive to the state of corresponding utilization controls. A plurality of series-connected coders detect the state of the utilization controls associated therewith. Decoders associated with each of said coders and in series connection in the same sequence as said corresponding coders control the state of the corresponding utilization circuits. A column timer is connected to each end of the series connections of said coders and decoders for applying control signals thereto. Each of the coders and decoders is sequentially activated to a first active state, during which they are operative to perform their assigned functions. Thereafter, each activated coder and decoder assumes an inactive state in which they permit the passage of control signals and data therethrough. The control signals can be applied in either direction along said series connections from either of said column timers.

20 Claims, 4 Drawing Figures

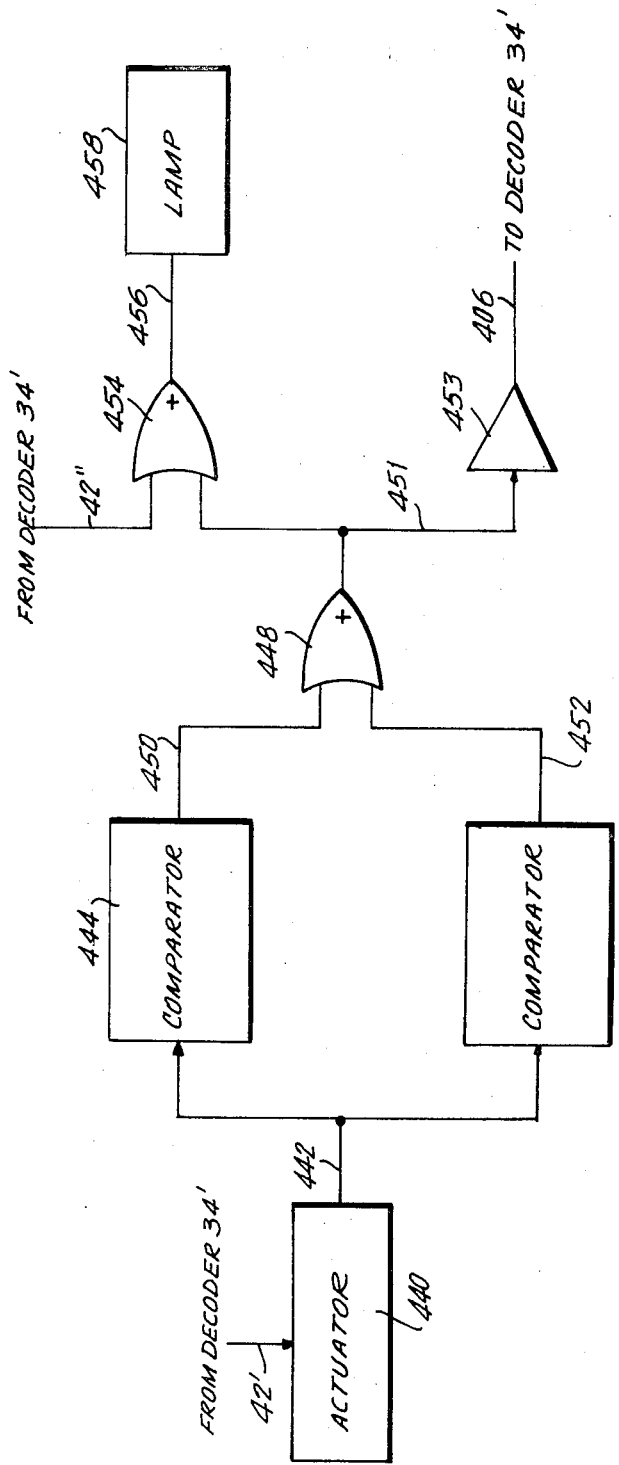

CONTROL SYSTEM HAVING COLUMN TIMERS AT EACH END

BACKGROUND OF THE INVENTION

This invention relates generally to control systems utilized to permit the control from a plurality of discrete stations of a plurality of utilization circuits associated therewith. An example of such a system would be the service system of an aircraft, wherein the plurality of stations are the seat locations therein. Another example of such a system would be a burglar and/or fire alarm system, wherein the plurality of stations are the monitoring stations therein. Each seat or group of seats has a number of utilization circuits associated therewith, such as service call lights and lamps for reading or general illumination which are to be controlled from the seats. In addition, each seat or group of seats has one or more automatically operated systems associated therewith, such as the oxygen systems. In the art, it was customary to provide direct wiring between a utilization control, such as a switch at each seat, and the corresponding utilization circuit. However, this approach resulted in large amounts of cabling and therefore added expense and weight in the aircraft. Still further cabling and expense was added to the cost of the system if centrally located supervisory utilization circuits, such as a central attendant call light responsive to the remotely located supervisory control means, were provided.

As an alternative to direct wiring between the individual utilization controls and corresponding utilization circuits, systems utilizing multiplexing techniques have been proposed. One such system is disclosed in U.S. Pat. No. 3,566,038, issued on Feb. 23, 1971, to Martin J. Slavin and assigned to the assignee herein. Said system proposes the use of a coder associated with each utilization control for transmitting data to a data line in assigned time slots representative of the state of said utilization control, and a decoder associated with the corresponding utilization circuits for detecting in assigned time slots from said data line said state data and controlling said utilization circuits in response thereto. The coders and decoders of said system are connected in series for sequential operation. This system suffers from the disadvantage that if the data line or series connection breaks, the elements downstream of the break are rendered inoperative. Further, the provision of both series connections and a separate data line adds to the cabling and expense of the system. An improvement on the system of U.S. Pat. No. 3,566,038 is disclosed in U.S. Pat. No. 3,585,595, issued on June 15, 1971, to Martin J. Slavin, Kenneth Cohen and Morton Pullman, and also assigned to the assignee herein. In the latter system, the data line is eliminated. The respectively series-connected coders and decoders are sequentially activated to a first active state, during which they are operative to perform their assigned functions. Thereafter, each activated coder and decoder assumes an inactive state in which they permit the passage of control signals and data therethrough. A column timer is placed in series connection with the coders and decoders for applying control signals thereto. One difficulty with this system is that if the column timer is disabled, then all of the decoders, coders and utilization circuits associated therewith are also disabled. Further, neither of the two above-described systems provides means for detecting the status of automatically operable utilization devices, such as oxygen supply systems.

SUMMARY OF THE INVENTION

Generally speaking, in accordance with the invention, an improvement in the closed-loop control system of U.S. Pat. No. 3,585,595 is provided incorporating a pair of column timers, one of said column timers being connected to each end of the series-connected coders and decoders. Each column timer includes column timer signal detector means and column timer signal generator means for permitting communication between the column timers through the series-connected coders and decoders while said coders and decoders are in the inactive state. The two column timers are adapted to apply control signals to the coders and decoders during alternate cycles of the system. Supervisory utilization circuit means would be connected to the respective column timer signal detector means for sounding an alarm should a signal not be received from the other of the column timers.

Two or more series-connected groups of coders and decoders may be provided connected between a single pair of column timers. Each group of decoders and coders would be alternately actuated by one of the column timers, so that during each cycle, each column timer is activating a portion of the groups.

Means is also incorporated in each of the coders to detect the status of a utilization circuit and to transmit a signal representative of said status to the column timers.

Accordingly, it is an object of this invention to provide a control system which permits individual control of a variety of utilization circuits.

Another object of the invention is to provide a control system incorporating series-connected elements wherein elements on both sides of a break in said closed loop are operative despite said break, and wherein the system will function despite a breakdown in the supervisory arrangement due to the provision of two such supervisory arrangements connected at opposed ends of the series-connected elements.

A further object of the invention is to provide a control system incorporating means for determining the status of utilization circuits.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 is a schematic representation of the means for detecting the status of a utilization circuit of the system of FIG. 1.

DESCRIPTION OF THE PREFERRED EMBODIMENTS

Figure 1:
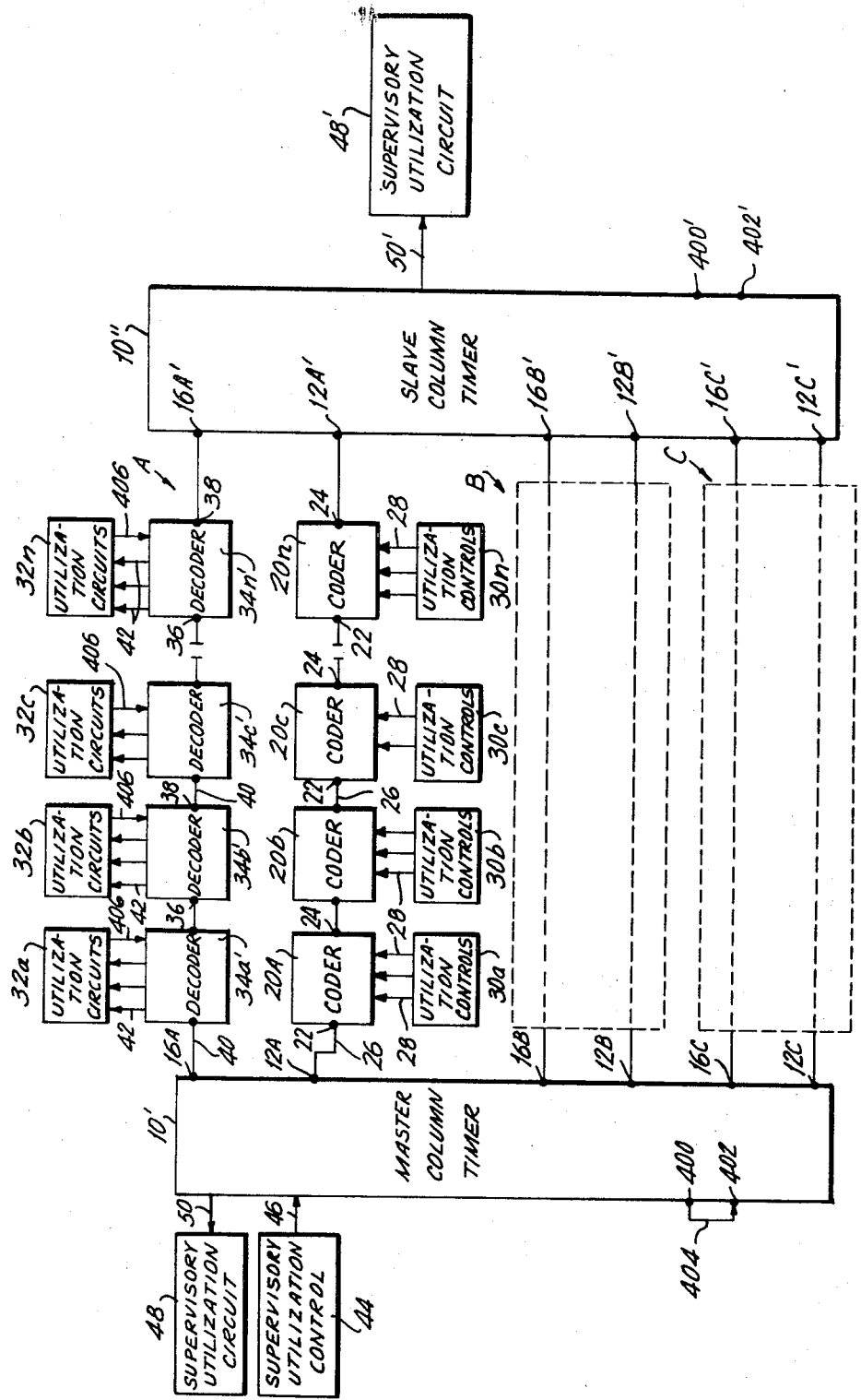
FIG. 1 is a schematic representation of one type of control system according to the invention.

The control system according to the invention is an improvement in the control system disclosed in U.S. Pat. No. 3,585,595, and accordingly, the specification and drawings of said patent are incorporated herein by reference. The reference numerals of said patent are utilized to identify like elements in the control system according to the invention. Reference is had to said patent for a detailed description of the structure and operation of the system, and the components thereof to the extent that said system and components correspond to the control system according to the invention.

Referring now to FIG. 1, the control system depicted incorporates a master column timer 10' having three coder terminals, 12A, 12B and 12C, and three decoder terminals, 16A, 16B and 16C. Further, master column timer 10' is provided with a pair of master/slave designation terminals, 400 and 402, joined by an external lead 404. The system also includes slave column timer 10" having three coder terminals, 12A', 12B' and 12C', and three decoder terminals, 16A', 16B' and 16C'. Slave column timer 10" is also provided with a pair of master/slave designation terminals, 400' and 402'. Slave column timer 10" is identical to master column timer 10' except for the absence of external lead 404, which is utilized to modify master column timer 10' so that said column timer serves as a "master" in the system of FIG. 1, as will be more particularly described below.

Master column timer 10' and slave column timer 10" are positioned between three groups of discrete stations, each of said group of stations having a coder 20, a decoder 34', utilization controls 30, and utilization circuits 32 associated therewith. Group A of said stations consists of a plurality of coders $20a, b, c, \ldots, n$ connected in series between coder terminals 12A and 12A' of the two column timers. Each coder is provided with a pair of terminals 22 and 24 for said series connection, interconnected by coder line 26. Operatively connected to each coder 20, by means of lines 28, are one or more utilization controls $28a, b, c, \ldots, n$. Each utilization control is adapted to be set in one or more states associated with the states in which the corresponding utilization circuits $32 a, b, c, \ldots, n$ are to be placed. Each coder 20 is adapted to detect the states of its corresponding utilization controls 30 and to store data representative of said states.

A plurality of decoders $34a', b', c', \ldots, n'$, are connected in series between decoder terminals 16A and 16A'. Each decoder is provided with a pair of terminals 36 and 38 interconnected in said series connection by decoder line 40. Each decoder 34 is connected by means of lines 42 to one or a group of utilization circuits 32. Said decoders are adapted to place their corresponding utilization circuits in the desired state in response to data received thereby in assigned time slots. Further, each decoder is connected to its associated utilization circuits by a line 406 through which the state of a utilization circuit may be detected upon command and transmitted to the column timers.

Each coder 20 is associated with the decoder 34' connected to the utilization circuits 32 which are, in turn associated with its utilization controls 30. Thus, coder 20b is associated with utilization controls 30b which are adapted to control utilization circuits 32b.

Accordingly, decoder 34b' is associated with coder 20b. The associated coders and decoders are disposed in their respective series connection in the same sequence. In this manner, when said coders and decoders are sequentially operated, only the corresponding pair of said coders and decoders are activated at any instant. Groups of stations B and C are formed in a like manner of similar components.

The control system according to the invention is adapted for cyclical operation. During each cycle, one of master column timer 10' and slave column timer 10" applies a control signal to either of coder terminals 12A or 12A'. Each cycle of said control signal is divided into at least $n+1$ frames, each frame being in turn divided into a plurality of time slots. Each of said time slots within the cycle is allotted to a particular element of data to be transmitted during the operation of the system, while the frames would be allocated in sequence to each associated coder and decoder. Thus, the first time frame of a cycle might be associated with coder 20a and decoder 34a', the second time frame might be associated with coder 20b and decoder 34b', etc. Within the first time frame, time slots would be allocated to contain data representative of the states of each of the three utilization controls 30a. Similarly, in the third time frame, time slots would be allocated to contain data representative of the states of the two utilization controls 30c. The control signal would include synchronization and clock timing components in assigned time slots and time frames. The synchronization component would be utilized to reset coders 20 and decoders 34' either at the end or beginning of a cycle. The column timers are also adapted to apply control signals of similar format to either of decoder terminals 16a and 16a'.

One time frame, preferably the last time frame would be allocated for communication between master column timer 10' and slave column timer 10". Said column timers do not simultaneously apply the control signals to the series connected coder and decoders. Rather, said column timers are adapted to alternately apply said control signals. Thus, during one or more cycles, master column timer 10' might apply the control signals to coder terminals 12A and 12C and decoder terminals 16A and 16C of groups A and C while slave column timer 10" simultaneously applies control signals to coder terminal 12B' and decoder terminals 16B' of group B. During the next one or more cycles, slave column timer 10" applies control signals to the coders and decoders of groups A and C while master column timer 10' applies control signals to group B.

The column timers are designated "master" and "slave" since master column timer 10' is adapted to transmit data identifying the groups to which it will apply control signals during the next cycle, slave column timer 10" acting in response to said transmitted data to apply its control signals to the other of said groups. Said data would be transmitted during the time frame of each cycle allocated for column timer communication. Said time frame is preferably at the end of each cycle since, at that point, all of the coders and decoders are in the inactive state, as will be more particularly described below. While the embodiment of the control system depicted in the drawings incorporates three groups, any number of groups of discrete stations may be provided between the master and slave column timers.

During normal operation, the master and slave column timers alternately apply control signals to each group so that control signals are applied in one or the other direction to each of groups A, B and C during each cycle. Should one of the master or slave column timers fail, that fact would be detected in the other of said master and slave column timers due to the failure to detect a signal in the time frame allocated for column timer communication. In this event, the remaining column timer would alternately apply control signals to groups A and B and to group C so that said control signals are applied to each group at least during every other cycle. The bit rate of the control signal is sufficiently fast so that such alternate operation is sufficient for control of the utilization circuits 32. Thus, the system will remain operational even in the face of the failure of one of the master or slave column timers. Further, the arrangement eliminates the necessity for the relatively long return cable provided between the single column timer 10 and coder 20n and decoder 34n of the system of U.S. Pat. No. 3,585,595. The latter consideration is particularly important for applications where weight is significant, as in the case of service systems for aircraft.

By way of example, one cycle of the control system according to the invention wherein a control signal is applied by master column timer 10' to group A will be described. In said cycle, master column timer 10' applies said control signal to coder terminal 12A, all of said coders 20 having been previously reset to a not-yet-activated state in response to the synchronization component during the previous cycle. The control signal would be detected at terminal 22 of coder 20a to place said coder in an active state which is maintained during the time frame assigned thereto consisting of a predetermined number of time slots. During said time frame, coder 20a transmits back through terminal 22 thereof, in appropriate time slots, the data representative of the state of utilization controls 30a. At the end of said time period, as determined by the detection of a predetermined number of said clock timing components, coder 20a is placed in an inactive state during which the data stored therein is no longer transmitted, but the control signal is passed therethrough, out of terminal 24 and into terminal 22 of coder 20b. Coder 20b is then activated for the period of its associated time frame and transmits the data representative of the state of utilization controls 30b out of its terminal 22 in the direction of coder terminal 12A of master column timer 10'. Since coder 20a is in its inactive state, said data is passed therethrough from terminal 24 to terminal 20 and to coder terminal 12A. this sequential operation continues until the nth coder has gone through an active state, at which time the column timer communication signal is transmitted and a synchronization component of the control signal resets all of coders 20 to dispose said coders in the not-yet-activated state for the next cycle. Each coder, when first activated, receives the control signal from the downstream coders and passes the data back through said downstream coders to column timer 10.

In like manner, master column timer 10' applies a control signal to decoder terminal 16 which first activates decoder 34a'. When so activated, said decoder receives in assigned time slots, the data transmitted by coder 20a, said column timer having interposed said data in the control signal applied from decoder terminal 16A. In response to said data, decoder 34a' places utilization circuits 32a in the desired state. Also during said time frame, if the control signal contains a command in an assigned time slot to determine the status of a utilization circuit, decoder 34a' detects the status of one of utilization circuits 32a and applies data representative of said status to assigned time slots in the control signal. Unlike the coders, decoders 34' do not transmit this status data in the downstream direction, but rather, add said data to the control signal transmitted upstream to the next decoder in the sequence. After remaining active for the time frame associated therewith, decoder 34a assumes an inactive state and passes the control signal along decoder line 40 from its terminal 38 to the terminal 36 of decoder 34b. In the embodiment of the control system shown in the drawings, decoders 34' do not require the capability of transmitting data back to the column timers, and need only pass the control signal therethrough during their inactive and not-yet-activated states.

All of decoders 20 are preferably identical and permit interchangeability and ready maintenance. In like manner, all of the decoders are preferably identical and interchangeable among themselves, the operation of the system being dependent on the placement of a particular coder or decoder in the series connection, rather than the design of a particular one of said coders or decoders.

Group A would operate in the same manner if the control signal were applied to coder terminal 12A' and decoder terminal 16A'. In such a case, coder 20n and decoder 34n' would be the first activated of said coders and decoders, the remaining coders and decoders being sequentially operated in the manner described above with the data from the respective coders being transmitted back to slave column timer 10" for application to said decoders.

The system is provided with a supervisory control 44 connected to master column timer 10' through line 46. Said supervisory control is preferably centrally located and adapted to apply data to column timer 10 during appropriate time slots to govern the state of certain utilization circuits 32. The master column timer is adapted to apply the data from supervisory control 44, if present, in place of the corresponding data from the appropriate coders 20 so that the state of the utilization circuits is determined by the state of supervisory control 44. The system also includes a supervisory utilization circuit 48 connected to master column timer 10' by line 50, said column timer being adapted to actuate said supervisory utilization circuit upon detecting certain data in assigned time slots of said control signal, and further, to activate said supervisory utilization circuit to provide an alarm if the failure of slave column timer 10" is detected. Similarly, a supervisory utilization circuit 48' is coupled by line 50' to slave column timer 10" for providing an indication of the failure of master column timer 10', as well as providing indication of the status of certain of the utilization circuits. A supervisory utilization control could also be provided in conjunction with slave column timer 10". Supervisory utilization circuits 48 and 48' would detect the utilization circuit status data transmitted by the decoders upon command to display the status of said utilization circuits. The command directing the determination of utilization circuit status would be initiated by supervisory utilization control 44.

Figure 2:
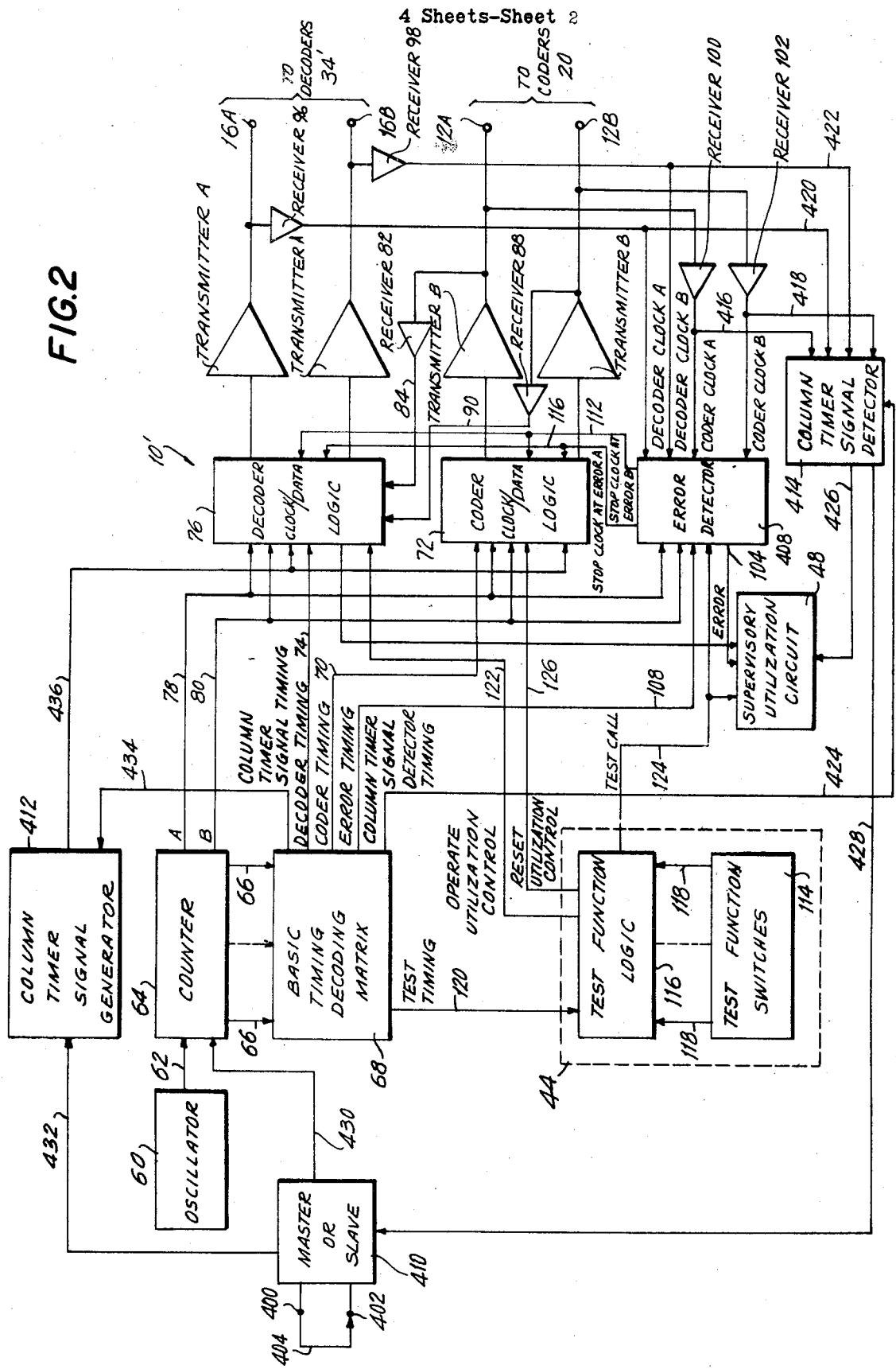
FIG. 2 is a schematic representation of a column timer of the system of FIG. 1.
Figure 3:
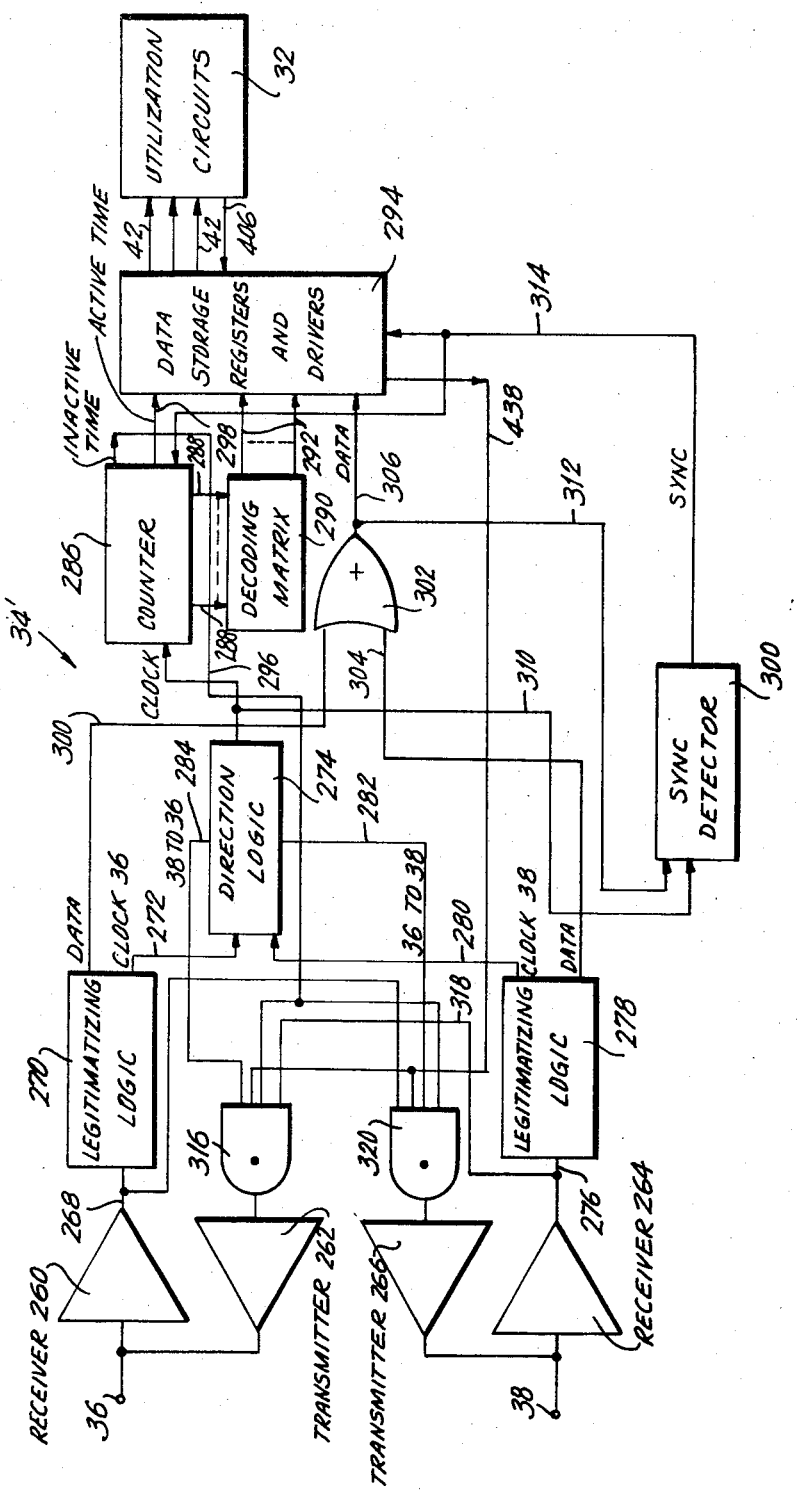
FIG. 3 is a schematic representation of a decoder of the system of FIG. 1.

In order to more particularly understand the operation of the system and further embodiments and features thereof, reference is had to FIGS. 2 - 4 of U.S. Pat. No. 3,585,595 and the description thereof in said patent. The detailed structure of the components of the control system according to the invention could be formed as described in said patent except as otherwise discussed below in connection with FIG. 2 hereof. Referring now to FIG. 2 hereof, a schematic representation of the portion of column timer 10' associated with groups A and B is depicted. Master column timer 10' differs from column timer 10 of U.S. Pat. No. 3,585,595 principally in the provision of circuitry associated with the communication between the master and slave column timers. Further, instead of controlling the direction of flow of control signals in the "left" and "right" directions of a closed loop, as in the case of U.S. Pat. No. 3,585,595, counter 64 controls the alternate application of the control signal to either group A or group B through signals applied along lines 78 and 80 respectively. Similarly, transmitters 80 and 92 are connected to coder terminal 12A and decoder terminal 16A respectively of group A, while transmitters 86 and 94 are connected to coder terminal 12B and decoder terminal 16B respectively of group B.

A further difference is the substitution of error detector 408 for loop error detector 96. Error detector 408 is adapted to detect if one of the coders or decoders in each group is shorted by detecting any discrepancy between the clock signals received from the coder and decoder terminal of each group. If such a discrepancy is identified, then appropriate signals are applied along lines 112 and 116 to coder clock/data logic 72 and decoder clock/data logic 76 so that instructions for the resetting of utilization circuits 32 are transmitted only in the time frames associated with the coders and decoders on the same side of said shorted coder or decoder as master column timer 10'. In other words, if coder 20c of group A is shorted, that fact would be detected by the discrepancy between the signals received at coder terminal 12A and decoder terminal 16A when control signals are applied to group A by slave column timer 10''. In response to such a detection, a suitable alarm would be actuated in supervisory utilization circuit 48 and only decoders 34a' and 34b' would be operated by the signal from the master column timer 10'. The control signal from slave column timer 10'', which is substantially identical to the master slave column timer, would activate decoders 34n', 34n-1', ... , 34d', so that all but the shorted decoder would function in the proper manner.

Communication between the master and slave column timers is achieved by means of master or slave circuit 410, column timer signal generator 412 and column timer signal detector 414. Column timer signal detector 414 is connected to each of coder terminals 12A and 12B and decoder terminal 16A and 16B through receivers 100, 102, 96 and 98 respectively and lines 416, 418, 420 and 422 respectively. Said column timer signal detector operates in response to timing signals received along line 424 from basic timing decoding matrix 68. Certain data in assigned time slots in the column timer signal received from slave column timer 10'' is applied along line 426 to supervisory utilization circuit 48 for the display of said data or the actuation of alarms. Further data in assigned time slots of said column timer signal detector is applied along line 428 to master or slave circuit 410. This data would include the data identifying the last group to which slave column timer 10'' applied the operating signal. Master or slave circuit 410 is provided with master/slave designation terminals 400 and 402, and since said terminals are joined by external lead 404, the column timer circuit of FIG. 2 is designated as the master. Were external lead 404 to be opened, then column timer 10' would be designated as the slave. Since the column timer of FIG. 2 is designated as the master, master or slave circuit 410 automatically transmits a signal along line 430 to counter 64 directing the alternate application of output signals along lines 78 and 80 of said counter for the alternate application of the control signal to groups A and B in alternate successive periods, which periods may each consist of a single cycle.

If the column timer of FIG. 2 were the slave column timer (external lead 404 opened), then the signal applied along line 430 would depend on the signal received from column timer signal detector 414. Thus, if the column timer signal from the master column timer indicated that the master column timer would drive group A in the next cycle, then master or slave circuit 410 would direct counter 64 to drive group B in the next cycle. Should no column timer signal be detected for a predetermined period of time, then master or slave circuit 410 would be adapted to automatically change the column timer operation to the master mode wherein counter 64 is automatically alternately directed to apply the control signal to groups A and B.

Further, master or slave circuit 410 applies a signal along line 432 to column timer signal generator 412 representative of the group to be activated in the annexed cycle for incorporation in the column timer signal. Said column timer signal generator operates in response to timing signals received from basic timing decoding matrix 68 along line 434. Further inputs may be provided to column timer signal generator 412 for incorporation in the column timer signal as desired. Thus, for example, certain utilization control or utilization circuit status information could be detected at error detector 408 and applied to column timer signal generator 412 in assigned time slots, if desired. The column timer signal is applied along line 436 to decoder clock/data logic 76 and coder clock/data logic 72 for application to the coder and decoder terminals in the time frame assigned to column timer communication.

The coders, decoders, utilization controls and utilization circuits more particularly described in U.S. Pat. No. 3,585,595 may be incorporated in the system according to the invention. An alternate embodiment of said decoder and utilization circuits is depicted in FIGS. 3 and 4. The coder 34' of FIG. 3 is sub-stantially identical to the coder of FIG. 4 of said patent except for the provision of line 406 intermediate utilization circuits 32 and data storage registers and drivers 294 for the application of a utilization circuit status signal to said data storage registers and drivers, and line 438 interconnecting said data storage registers and drivers and AND gates 316 and 320. The latter line permits the application of said utilization circuit status signal to appropriate time slots in the frame of the control signal associated with that particular decoder. Determination of utilization circuit status is achieved in response to one or more data bits in assigned time slots in said frame received by the data storage registers and drivers and directing the performance of the utilization circuit status determination. The utilization circuit status data could be detected by error detector 408 of the column timer of FIG. 2 for application to supervisory utilization circuit 48 along line 104.

Referring now to FIG. 4, one example of a utilization circuit particularly adapted for status determination is depicted. In said arrangement, the status of actuator 440 is to be detected. The command for status determination is received from decoder 34' along line 42' which results in the application of a voltage of a predetermined value to actuator 440. An output voltage is produced along lines 442 from actuator 440 and applied to comparators 444 and 446. In one embodiment, said comparators would be adapted to determine if the output signal along line 442 lies within a predetermined voltage range, comparator 444 determining the upper limit of the range and comparator 446 determining the lower limit of the range. If the voltage on line 442 lies outside of the predetermined range, a signal would be applied from one of comparators 444 and 446 to OR gate 448 along lines 450 and 452 respectively. The output of OR gate 448 is applied along line 451 to transmitter 453, which applies an actuator status signal along line 406 to decoder 34'. An additional feature of the circuit of FIG. 4 is that the signal from OR gate 448 is also applied to OR gate 454, the output of which is connected along line 456 to lamp 458 located at the discrete station associated with actuator 440 to provide an immediate visual indication of the failure of actuator 440 to pass the applied test. Lamp 458 may constitute one of the utilization circuits controlled by utilization controls 30, in which case the other input to OR gate 454 would be line 42" coupled to decoder 34' for the application of control signals to the lamp in response to the status of said utilization controls.

In one application of the control system according to the invention to the service system of aircraft, actuator 440 may be associated with safety equipment located at each discrete station, such as oxygen equipment. Other components of such safety equipment could also be tested, such as the solenoid controls thereof.

It will thus be seen that the objects set forth above, and those made apparant from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A control system for a plurality of discrete stations comprising a plurality of utilization circuits; at least one utilization control means disposed at each of said stations and associated with at least one of said utilization circuits; a plurality of series connected coder means for detecting the state of the utilization control means associated therewith; decoder means associated with each of said coder means for controlling the state of the corresponding utilization circuits, said decoder means being in series connection in the same sequence as said corresponding coder means; and first and second column timer means, said series connected coder and decoder means being connected between said first and second column timer means, said first and second column timer means being adapted to alternately apply control signals to said series connections, said coder and decoder means being sequentially activated in response to said control signals during assigned time frames, each of said coder means being adapted, when first activated during a cycle of said system, to transmit in assigned time slots within its time frame data representative of the state of the utilization control means associated therewith to the column timer means applying said control signal through any of said coder means previously activated during said cycle, said coder means being adapted to thereafter for the balance of said cycle to pass the control signal and the data transmitted by downstream coder means, said first and second column timer means being adapted to incorporate in the control signal respectively applied to said decoder means the data representative of said utilization control means states transmitted thereto by said coder means, each of said decoder means being adapted, when first activated during a cycle of said system, to receive during assigned time slots said data from said column timer means through any previously activated decoder means to control the corresponding utilization circuits, said decoder means being adapted to thereafter for the balance of said cycle passed the control signal to downstream decoders, whereby each of said utilization circuits is placed in a state responsive to the state of its corresponding utilization control means.

2. A control system as recited in claim 1, incorporating at least two groups of said series connected coder and decoder means and associated utilization circuits and utilization control means connected between said first and second column timer means, each of said first and second column timer means alternately applying said control signal to first and second portions of said groups of coder and decoder means during successive time periods so that, during normal operation, all of said groups of coder and decoder means have a control signal applied thereto during each of said successive periods by one of said first and second column timer means.

3. A control system as recited in claim 2, wherein each of said first and second column timer means includes column timer signal generator means for producing in a predetermined time frame of each cycle a column timer signal, and column timer signal detector means for detecting said column timer signal in said time frame.

4. A control system as recited in claim 3, wherein said first column timer means includes means for automatically alternately applying said control signal to the two portions of said groups of coder and decoder means in successive time periods, said second column timer means applying its control signal to the groups of coders and decoders designated in the column timer signal from said first column timer means.

5. A control system as recited in claim 4, wherein said second column timer means automatically alternately applies said control signal to said first and second portions of said groups of coder and decoder means upon failure to receive a column timer signal from said first column timer means for a predetermined period.

6. A control system as recited in claim 4, wherein each of said first and second column timer means is adapted to alternately apply said control signal to said groups of coder and decoder means upon the failure of the other of said first and second column timer means.

7. A control system as recited in claim 3, including supervisory utilization circuit means connected to each of said first and second column timer means for actuation to provide an indication should the column timer signal detector means of either of said first or second column timer means fail to detect the column timer signal from the other of said first or second column timer means.

8. A control system as recited in claim 1, including a further utilization circuit associated with at least a portion of said decoder means, said decoder means including means for detecting the status of the further utilization circuit associated therewith in response to a command signal in the time frame of the control signal associated therewith, and for applying a status signal to predetermined time slots in the time frame associated therewith for transmittal upstream along the series connected decoder means to one of the first and second column timer means which did not apply said control signal, said one of said first and second column timer means including means for detecting said status signal period.

9. A control system as recited in claim 8, wherein said status detector means further includes means for actuating one of said first-mentioned utilization circuits associated therewith in response to the detection of a predetermined state of said further utilization circuit to place said first-mentioned utilization circuit in a predetermined identifiable state.

10. A control system as recited in claim 9, wherein said control system is a passenger aircraft service system including an oxygen supply system, said further utilization circuit being control means for said oxygen supply system.

11. A control system as recited in claim 1, wherein said first and second column timer means are each adapted to produce control signals incorporating a synchronization portion in each cycle of said system, said coder and decoder means being adapted to be reset in response to said synchronization portion to commence a new cycle of said system.

12. A control system as recited in claim 1, wherein each of said first and second column timer means includes error detector means to receive the control signals transmitted through said coder and decoder means from the other of said column timer means to detect discrepancies in the signals so transmitted to detect defective code and decoder means; and means for controlling the generation of said control signals in said first and second column timer means in response to said error detector means to prevent the application of operative data to said control signal time frames associated with the defective coder or decoder means and the coder or decoder means downstream of said defective coder or decoder means.

13. A control system as recited in claim 1, wherein each of said first and second column timer means is adapted to produce control signals including clock timing components in assigned time slots, the sequential operation of said system being responsive to said clock timing components.

14. A control system as recited in claim 1, wherein said coder means are substantially identical, and said decoder means are substantially identical.

15. A control system as recited in claim 1, including supervisory utilization control means connected to at least one of said first and second column timer means and associated with at least one of said utilization circuits, said one column timer means being adapted to detect the state of said supervisory utilization control means and to incorporate in the time slots of the control signal applied to said decoder means data representative of said supervisory utilization control means states for the control of said utilization circuits by the corresponding decoder means, said data being applied in place of the data transmitted by the coder means associated with said utilization circuits.

16. A control system as recited in claim 1, wherein said coder means are adapted to establish the state of at least one utilization control means associated therewith, said system including supervisory utilization control means associated with said controllable utilization control means, said column timer means being adapted to detect the state of said supervisory utilization control means and to incorporate in assigned time slots of the control signal applied to said series connected coder means data representative of the state of said supervisory utilization control means, each of said coder means being adapted to receive such data when first activated for controlling the state of said controllable utilization control means.

17. A control system as recited in claim 1, wherein each of said first and second column timer means is adapted to produce a control signal for application to said series connected coder means including synchronization and clock timing components, the sequential operation of said coder means between a first not-yet-activated state, a second active state and a third inactive state being in response to said clock timing components during each cycle of said system, said coder means being adapted to be reset to said not-yet-activated state in response to said synchronization component.

18. A control system as recited in claim 17, wherein said coder means includes a pair of terminals for said series connection; direction logic means connected to said terminals for producing a direction signal representative of the terminal from which said control signal is received; data storage means for storing data representative of the state of the corresponding utilization control means; gate signal means for generating, in response to said clock timing components of said control signal applied thereto during said active and inactive states of said coder means, gating signals representative respectively of said inactive state, active state, and the time slots assigned to the transmission of data; and gating means responsive to said gating and direction signals, said gating means being connected to the terminal at which said control signal is received to apply to said terminal, during said active state, the data stored in said data storage means and, during the time slots assigned to the transmission of data occurring during said inactive state, the data received from the other of said terminals, said gating means being connected to the other of said terminals, for the application thereto, during said inactive state, of the clock timing components of said control signal.

19. A control system as recited in claim 18, wherein said control signal includes data transmitted by said column timer means in assigned time slots, said data storage means being connected to said terminals to receive such data during assigned time frames, said gating signal means producing gating signals representative of the time slots assigned to said data transmitted by said column timer, said gating means, during said time slots assigned to said column timer data occurring during said inactive state, applying said column timer data to said other terminal.

20. A control system as recited in claim 19, wherein said decoder means includes a pair of terminals for said series connection; direction logic means connected to said terminals for producing a direction signal representative of the terminal to which said control signal is applied; data storage means connected to said terminals for detecting data components of said control signal during assigned time slots; gating signal means for producing gating signals representative of said active and inactive states respectively in response to the clock timing components of said control signal and gating means responsive to said direction and gating signals for applying, during said inactive state, said control signal to the terminal to which said control signal was not applied.

* * * * *